US009869897B2

(12) United States Patent
Liu

(10) Patent No.: US 9,869,897 B2
(45) Date of Patent: Jan. 16, 2018

(54) QUANTUM DOT LIGHT-EMITTING DEVICE, BACKLIGHT MODULE, AND DISPLAY DEVICE

(71) Applicant: HISENSE ELECTRIC CO., LTD., Qingdao (CN)

(72) Inventor: Yiyin Liu, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 40 days.

(21) Appl. No.: 15/018,446

(22) Filed: Feb. 8, 2016

(65) Prior Publication Data

US 2016/0363814 A1 Dec. 15, 2016

(30) Foreign Application Priority Data

Jun. 10, 2015 (CN) .......................... 2015 1 0315996

(51) Int. Cl.
*F21V 9/16* (2006.01)
*G09F 13/04* (2006.01)
*G02F 1/1335* (2006.01)

(52) U.S. Cl.
CPC .. *G02F 1/133605* (2013.01); *G02F 1/133617* (2013.01); *G02F 1/133603* (2013.01);
(Continued)

(58) Field of Classification Search
CPC ............. F21Y 2103/30; F21Y 2107/50; F21Y 2115/10; F21Y 2115/15
(Continued)

(56) References Cited

U.S. PATENT DOCUMENTS

2009/0140638 A1* 6/2009 Asano .................. G09G 3/3233
313/504
2013/0334557 A1* 12/2013 Uchida ................. H01L 23/564
257/98

(Continued)

FOREIGN PATENT DOCUMENTS

CN 1981219 A 6/2007
CN 102222750 A 10/2011
(Continued)

OTHER PUBLICATIONS

Office Action from corresponding Chinese Application No. 201510315996.X, dated Jul. 4, 2017 (10 pages).

*Primary Examiner* — Daniel St Cyr
(74) *Attorney, Agent, or Firm* — Harness, Dickey & Pierce, P.L.C.

(57) ABSTRACT

Embodiments of the disclosure provide a quantum dot light emitting device and a backlight module, where the quantum dot light emitting device includes: a quantum dot film including a plurality of quantum dots; a backlight source configured to emit light rays in a first band to the quantum dot film to excite the plurality of quantum dots to emit light rays in a second band; a wavelength selector, arranged between the quantum dot film and the backlight source, configured to transmit the light rays in the first band, and to reflect the light rays in the second band emitted by the quantum dot film to the wavelength selector; and a groove-shaped bracket including two side brackets arranged opposite to each other, and a bottom plate connected between the two side brackets, wherein the backlight source is fixed on the bottom plate, and both ends of the quantum dot film and the wavelength selector are arranged on the two side brackets. The quantum dot light emitting device and the backlight module according to the disclosure improve the utilization ratio of the light rays.

17 Claims, 6 Drawing Sheets

(52) U.S. Cl.
CPC ............ *G02F 2001/133614* (2013.01); *G02F 2202/36* (2013.01)

(58) Field of Classification Search
USPC .................................................. 362/84, 97.1
See application file for complete search history.

(56) References Cited

U.S. PATENT DOCUMENTS

| | | |
|---|---|---|
| 2013/0335677 A1 | 12/2013 | You |
| 2014/0021503 A1* | 1/2014 | Yoshida ................ H01L 33/641 257/98 |
| 2014/0022779 A1* | 1/2014 | Su ............................ F21K 9/64 362/231 |
| 2014/0264419 A1* | 9/2014 | Kim ...................... H01L 33/504 257/98 |
| 2014/0334181 A1* | 11/2014 | Hu ........................ G02B 6/0023 362/608 |
| 2014/0339495 A1* | 11/2014 | Bibl ...................... H01L 33/504 257/13 |
| 2016/0020366 A1* | 1/2016 | Hwang .................. H01L 22/10 438/16 |

FOREIGN PATENT DOCUMENTS

| CN | 102509759 A | 6/2012 |
|---|---|---|
| CN | 104421772 A | 3/2015 |

* cited by examiner

QUANTUM DOT LIGHT-EMITTING DEVICE, BACKLIGHT MODULE, AND DISPLAY DEVICE

CROSS-REFERENCE TO RELATED APPLICATION

This application claims the benefit and priority of Chinese Patent Application No. 201510315996.X filed Jun. 11, 2015. The entire disclosure of the above application is incorporated herein by reference.

FIELD

The present disclosure relates to the field of displays and particularly to a quantum dot light-emitting device, a backlight module, and a display device.

BACKGROUND

This section provides background information related to the present disclosure which is not necessarily prior art.

Along with the development of the society, liquid crystal display devices have been increasingly widely applied, for example, to liquid crystal TV sets, computers, handsets, video cameras, digital cameras, electronic watches, calculators, and other occasions. A liquid crystal display device generally includes a liquid crystal panel, and a backlight module. The liquid crystal panel is consisted of a Color Filter (CF) substrate, a Thin Film Transistor (TFT) array substrate, and liquid crystals encapsulated between the two substrates, and drive voltage is applied to the two substrates to control liquid crystal molecule to rotate, so that light rays of the backlight module are refracted out to create a corresponding picture. The backlight module includes a backlight source and an optical film to provide the liquid crystal panel with white backlight.

In the prior art, the light rays emitted by the backlight source in the backlight module typically needs to be processed by an optical processing element to obtain the white backlight with highly saturated color so as to provide the liquid crystal display device with a high color gamut. The optical processing element is typically a quantum dot film.

SUMMARY

This section provides a general summary of the disclosure, and is not a comprehensive disclosure of its full scope or all of its features.

One aspect of the disclosure provides a quantum dot light emitting device including:

a quantum dot film including a plurality of quantum dots;

a backlight source configured to emit light rays in a first band to the quantum dot film to excite the plurality of quantum dots to emit light rays in a second band; and a wavelength selector, arranged between the quantum dot film and the backlight source, configured to transmit the light rays in the first band, and to reflect the light rays in the second band emitted by the quantum dot film to the wavelength selector.

Another aspect of the disclosure provides a backlight module including the quantum dot light emitting device above.

A further aspect of the disclosure provides a display device including the quantum dot light emitting device above.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
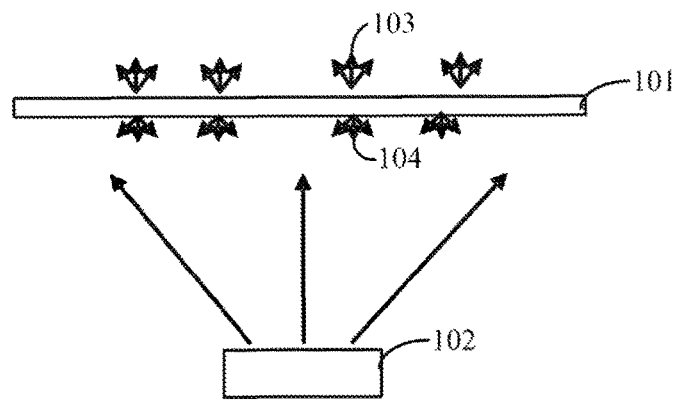
FIG. 1 is a schematic structural diagram of a quantum dot light emitting device in the prior art.

FIG. 1 is a schematic structural diagram of a quantum dot light emitting device in the prior art. As illustrated in FIG. 1, after a quantum dot layer 101 in a quantum dot film is excited by light rays of a backlight source 102 to emit red and green light, a part of the light is transmitted forward directly to exit, e.g., first light rays 103, and the other part of the light is scattered backward, e.g., second light rays 104, so that there may be a poorer effect of white backlight provided by a liquid crystal panel.

In view of this, an embodiment of the disclosure provides a quantum dot light emitting device, a backlight module, and a display device so as to address the drawback in the prior art that the light rays scattered backward in the quantum dot layer may be underutilized.

Figure 2A:
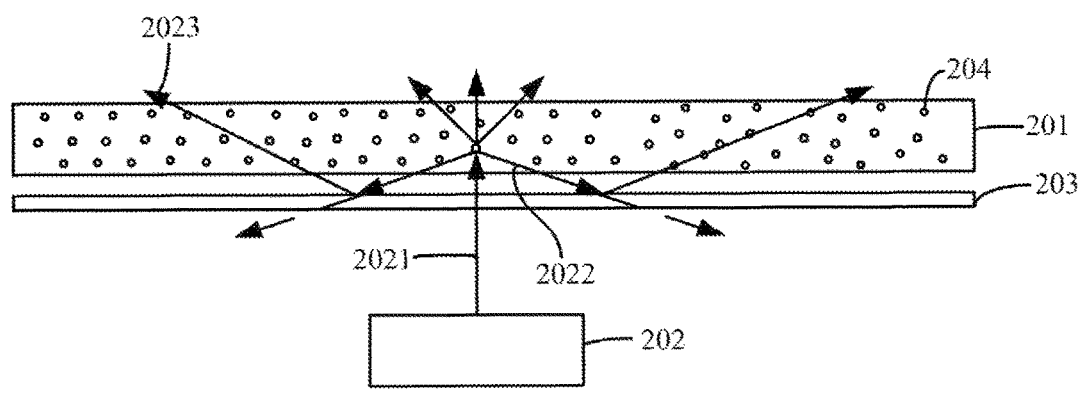
FIG. 2A is a schematic diagram of directions of respective light rays in a quantum dot light emitting device according to an embodiment of the disclosure.

This embodiment provides a quantum dot light emitting device for generating backlight, e.g., white backlight. FIG. 2A illustrates a schematic diagram of directions of respective light rays in the quantum dot light emitting device according to this embodiment. The quantum dot light emitting device 200 includes a quantum dot film 201, a backlight source 202, and a wavelength selector 203.

Particularly the quantum dot film 201 includes a plurality of quantum dots 204; the backlight source 202 is configured to emit light rays in a first band to the quantum dot film 201 to excite the plurality of quantum dots 204 to emit light rays in a second band; and the wavelength selector 203 arranged between the quantum dot film 201 and the backlight source 202 is configured to transmit the light rays 2021 in the first band, and to reflect the light rays 2022 in the second band emitted by the quantum dot film 201 to the wavelength selector 203 so that the reflected light rays are redirected into reflected light rays 2023 emitted toward the quantum dot film 201.

The quantum dots 204 are photoluminescent crystal semiconductors and the color of emitted light is determined by the sizes of the quantum dots 204. Since the quantum dots 204 may be degraded due to high temperature and oxygen, the quantum dots 204 are typically encapsulated in a film, which is the quantum dot film 201 as in this embodiment.

The backlight source 202 can be a Light Emitting Diode (LED) lamp which can emit light rays in colors, e.g., blue or purple. Of course the backlight source can alternatively be any one of various chips capable of emitting light.

If the backlight source 202 is a blue light source, then wavelengths in the first band range from 446 nm to 464 nm, i.e., the band of blue light, and the blue light source excites the quantum dots 204 to emit red and green light, that is, the second band is consisted of the red light band and the blue light band, the wavelengths in which range respectively from 620 nm to 760 nm and 500 nm to 578 nm. Due to the wavelength sector 203, the blue light can be transmitted through the wavelength sector 203 to the quantum dots 204 so that the quantum dots 204 emit red and green light. The light rays reflected backward, i.e., the light rays scattered toward the wavelength selector 203, are reflected by the wavelength selector 203 to be redirected forward to exit that is, toward the quantum dot film 201, to thereby be mixed with the blue light transmitted through the quantum dot film 201 into white light.

If the backlight source 202 is a purple light source, then the wavelengths in the first band range from 400 nm to 446 nm, i.e., the band of purple light, and the purple light source exits the quantum dots 204 to emit red, green and blue right, that is, the second band is consisted of the red light band, the green light band, and the blue light band, the wavelengths in which range respectively from 620 nm to 760 nm, 500 nm to 578 nm, and 446 nm to 464 nm. Due to the wavelength selector 203, the light rays scattered backward, i.e., the light rays scattered toward the wavelength selector 203, are reflected by the wavelength selector 203 to be redirected forward to exit, that is, toward the quantum dot film 201, so that this part of the light rays can be mixed with the blue light transmitted through the quantum dot film 201 into white light. It shall be noted that the numbers of quantum dots for generating the red, green and blue light can be configured for white light to be generated, and all the purple light can excite the quantum dots 204; and since the purple light excites the quantum dots 204 to generate the red, green and blue light in the second band, all of which are reflected by the wavelength selector 203, the purple light source will be more efficient than the blue light source.

The wavelength selector 203 in this embodiment can be structured of a film coated on a glass layer or can be structured of a film on a film layer, but this embodiment will not be limited thereto. For example, the wavelength selector in this embodiment can be formed by arranging an optical coating alternately on a glass substrate, possibly in a progressive vacuum deposition process, to selectively have the transmission of light enhanced at some wavelengths and suppressed at the other wavelengths, where the thickness and the amount of the optical coating can be controlled to reflect the light rays in the second band and to transmit the light rays in the first band, as done in forming a dichroscope coating in a laser optical system. The wavelength selector in this embodiment can be embodied as a prism filter, or an interference filter which can be particularly a mode coupling filter or a multi-layer medium thin film filter or a Fabry-Perot filter, where particular materials and fabrication processes thereof are known in the prior art, so a repeated description thereof will be omitted here.

Figure 2B:
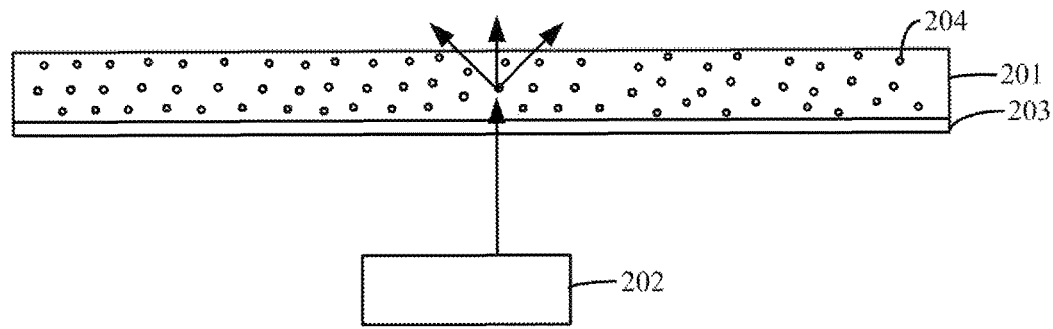
FIG. 2B is a schematic structural diagram of a quantum dot light emitting device according to an embodiment of the disclosure.

As illustrated in FIG. 2B which is a schematic structural diagram of the quantum dot light emitting device according to this embodiment, both the quantum dot film 201 and the wavelength selector 203 are flat plate-shaped, and can be fit to each other, that is, the lower surface of the quantum dot film 201 is fitted to the upper surface of the wavelength selector 203 Since photons may be absorbed by some substance in the air while light rays are being propagated in the air, energy of the light lays may be lost, the quantum dot film 201 and the wavelength selector 203 can be fitted to each other to shorten the distance over which the light rays are propagated, and further the distance over which the light rays scattered backward by the quantum dots 204 are propagated while being reflected to the quantum dot film 201, so as to alleviate the energy thereof from being lost.

As compared with the prior art, in the quantum dot light emitting device according to this embodiment, the wavelength selector 203 is arranged between the backlight source 202 and the quantum dot film 201 to transmit the light rays in the first band, and to reflect the light rays in the second band, so that the light rays in the first band emitted by the backlight source 202 are incident on the quantum dot film 201 and excite the quantum dot film 201 to emit the light rays in the second band, and the light rays in the second band scattered backward are reflected by the wavelength selector 203 to be emitted again to the quantum dot film 201, and to excite the quantum dots 204 to emit the light rays in the second band, or to be transmitted through the quantum dot film 201 to be mixed with the other light rays into the backlight, to thereby improve the utilization ratio of the light rays emitted by the quantum dots 204 and generate more backlight for a better effect. Thus the desirable backlight can be generated while lowering the power of the backlight source 202 to thereby both conserve energy to protect the environment, and avoid heat radiated by the backlight source 202 from affecting the other components of the product, for example, so that the other components can be avoided as much as possible from aging while being heated, to thereby prolong the lifetime of the product in service and improve the quality of the product.

Figure 3:
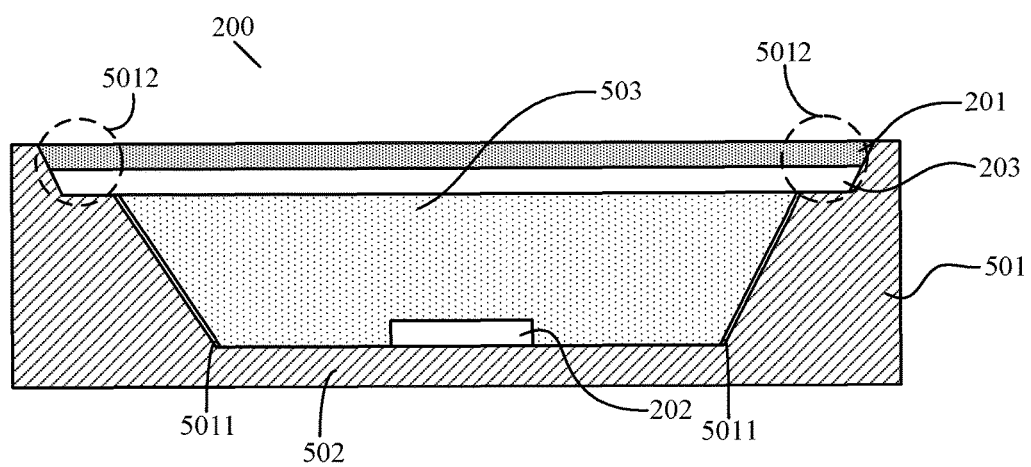
FIG. 3 is a schematic structural diagram of a quantum dot light emitting device according to another embodiment of the disclosure.

FIG. 3 is a schematic structural diagram of a quantum dot light emitting device according to an embodiment of the disclosure. The structure illustrated in FIG. 3 is different from FIG. 2B in that in this embodiment, the quantum dot light emitting device further includes a groove-shaped bracket including two side brackets 501 arranged opposite to each other, and a bottom plate 502 connected between the two side brackets 501, where the backlight source 202 is fixed on the bottom plate 502, and both ends of the quantum dot film 201 and the wavelength selector 203 are arranged on the two side brackets 501.

Optionally the angle of the side brackets 501 to the bottom plate 502 is an obtuse angle so that the light rays of the backlight source 202 are emitted as many as possible toward the quantum dot film 201, and the angle can be controlled to control the direction in which the light rays of the backlight source 202 exit. Moreover a reflection film 5011 can be further arranged on inner walls of the side brackets 501 so that the light rays incident on the inner walls of the side brackets 501 can be emitted as many as possible toward the quantum dot film 201 to thereby further improve the utilization ratio of the backlight source 202.

As illustrated in FIG. 3, in this embodiment, the quantum dot film 201 and the wavelength selector 203 are jointed on recesses 5012 of the two side brackets 502 of the groove-shaped bracket, and a transparent silica gel material layer 503 can be filled between the wavelength selector 203 and the bottom plate 502 to further secure the wavelength selector 203 and the bottom plate 502, that is, the transparent silica gel material layer 503 is filled between the wavelength selector 203 and a space surrounded by the groove-shaped bracket. In the quantum dot light emitting device 200, both side ends of the quantum dot film 201 and the wavelength selector 203 are inclined to match the side brackets 502, and can be locked between the two recesses 5012 to be secured with the side brackets 502; or can be affixed and thus secured with the side brackets 502 into an integrally closed structure, particularly as required in reality, although a repeated description thereof will be omitted here.

Reference can be made to the quantum dot light emitting device illustrated in FIG. 2B for other structures and functions of the quantum dot light emitting device according to this embodiment, so a repeated description thereof will be omitted here.

Figure 4:
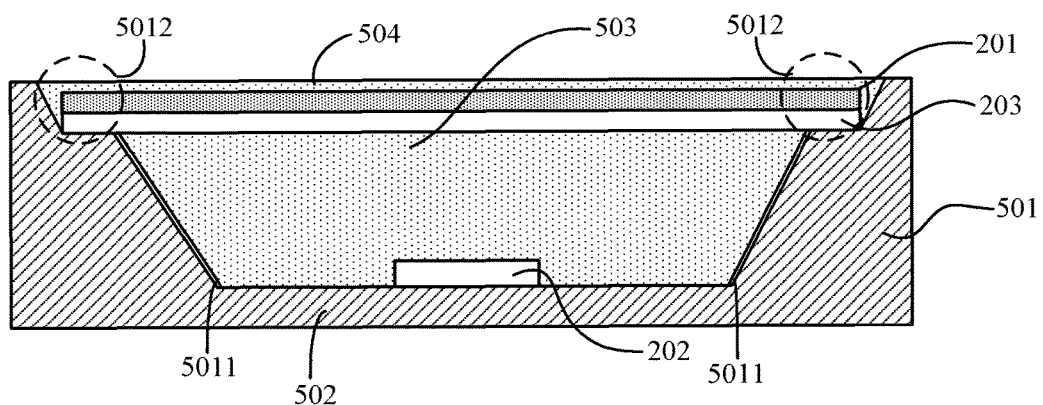
FIG. 4 is a schematic structural diagram of a quantum dot light emitting device according to a further embodiment of the disclosure.

FIG. 4 illustrates a schematic structural diagram of a quantum dot light emitting device according to a further embodiment of the disclosure. The structure illustrated in FIG. 4 is different from FIG. 3 in that in this embodiment, both ends of the quantum dot film 201 and the wavelength selector 203 are perpendicular to the bottom plate 502. Particularly the quantum dot light emitting device according to this embodiment can has the quantum dot film 201 and the wavelength selector 203 encapsulated on the groove-shaped bracket using a hydro and oxygen-isolation layer 504 into an integrally closed structure, and as can be apparent from FIG. 4, the hydro and oxygen-isolation layer 504 is arranged on the upper surface of the quantum dot film 201, and the side ends of the quantum dot film 201 and the wavelength selector 203, where the hydro and oxygen-isolation layer 504 can be structured of two metal oxide films and a macromolecule organic film to isolate hydro and oxygen-impurities and to improve the anti-eroding capability, and since the hydro and oxygen-isolation layer 504 is known in the art, a repeated description thereof will be omitted here. Of course the quantum dot film 201 and the wavelength selector 203 can alternatively be encapsulated otherwise, particularly as required in reality.

Reference can be made to the quantum dot light emitting device illustrated in FIG. 2B or FIG. 3 for other structures and functions of the quantum dot light emitting device according to this embodiment, so a repeated description thereof will be omitted here.

Figure 5:
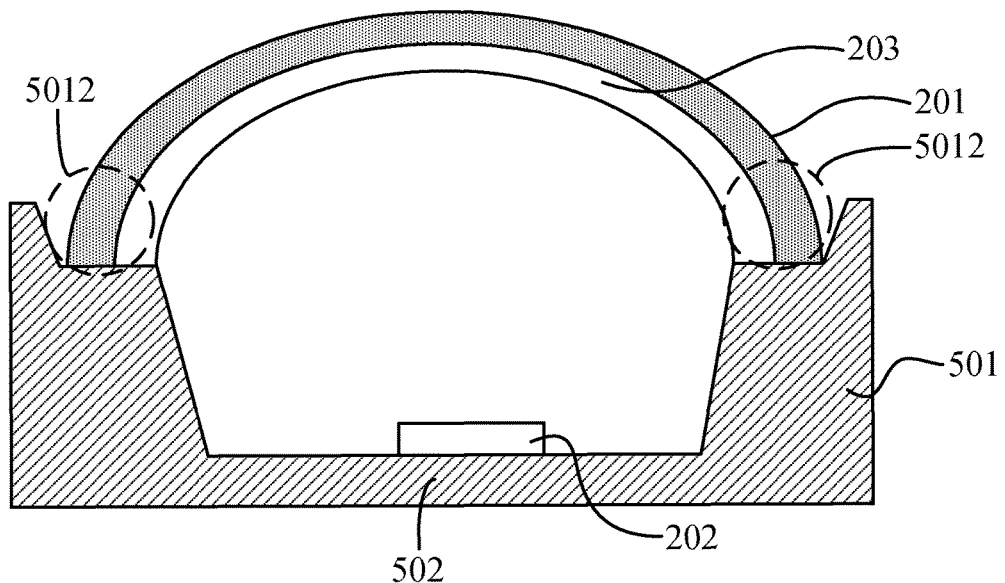
FIG. 5 is a schematic structural diagram of a quantum dot light emitting device according to a still further embodiment of the disclosure.

FIG. 5 illustrates a schematic structural diagram of a quantum dot light emitting device according to a still further embodiment of the disclosure. The structure illustrated in FIG. 5 is different from FIG. 2B, FIG. 3 and FIG. 4 in that in this embodiment, both the quantum dot film 201 and the wavelength selector 203 are arc-shaped protruding away from the backlight source 202.

As illustrated in FIG. 5, both ends of the quantum dot film 201 and the wavelength selector 203 are arranged respectively on the recesses of the side brackets of the groove-shaped bracket. More particularly a transparent silicon gel material layer (not illustrated) can be filled between the wavelength selector 203 and the space surrounded by the groove-shaped bracket to further secure the wavelength selector 203 and the bottom plate 502. Of course a hydro and oxygen-isolation layer (not illustrated) can also be arranged on the upper surface of the quantum dot film 201, and the side ends of the quantum dot film 201 and the wavelength selector 203, where the hydro and oxygen-isolation layer can be structured of two metal oxide films and a macromolecule organic film to isolate hydro and oxygen-impurities and to improve the anti-eroding capability, and since the hydro and oxygen-isolation layer is known in the art, a repeated description thereof will be omitted here Reference can be made to the quantum dot light emitting device illustrated in FIG. 2B or FIG. 3 or FIG. 4 for other structures and functions of the quantum dot light emitting device according to this embodiment than the shapes of the quantum dot film 201 and the wavelength selector 203, so a repeated description thereof will be omitted here.

Figure 6:
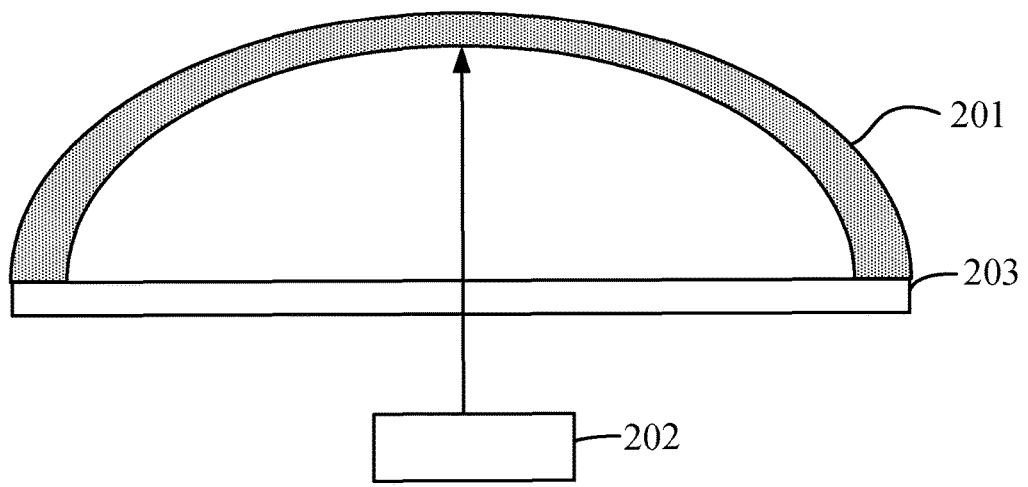
FIG. 6 is a schematic structural diagram of a quantum dot light emitting device according to another embodiment of the disclosure.

Optionally the quantum dot film 201 and the wavelength selector 203 in the embodiment above may not be fitted to each other. As illustrated in FIG. 6, the quantum dot film 201 is arc-shaped protruding away from the backlight source 202, and the wavelength selector 203 is flat plate-shaped. Of course the quantum dot film 201 and the wavelength selector 203 can alternatively be shaped otherwise as required in reality, so a repeated description thereof will be omitted here.

Figure 7:
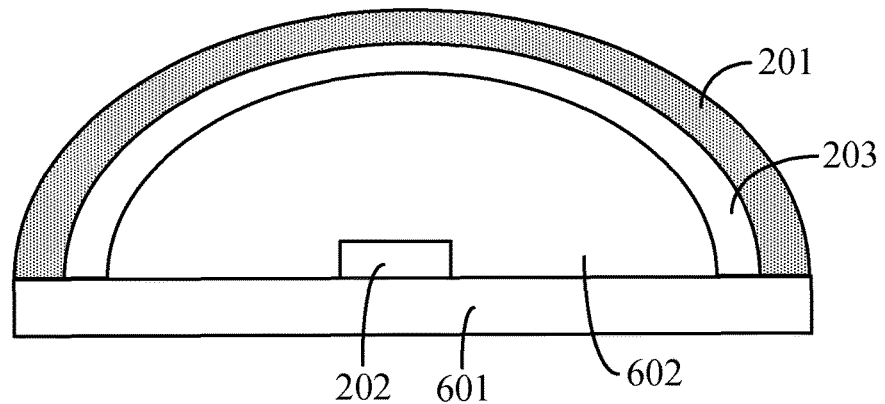
FIG. 7 is a schematic structural diagram of a quantum dot light emitting device according to a further embodiment of the disclosure.

A further embodiment of the disclosure provides a quantum dot light emitting device, and FIG. 7 illustrates a schematic structural diagram of the quantum dot light emitting device according to this embodiment.

The structure illustrated in FIG. 7 is different from FIG. 2B in that this embodiment relates to Chip On Board (COB) encapsulation, where the quantum dot light emitting device further includes a Printed Circuit Board (PCB) 601, the backlight source 202 is fixed on the PCB 601, both the quantum dot film 201 and the wavelength selector 203 arc-shaped protruding away from the backlight source 202, and both ends of the quantum dot film 201 and the wavelength selector 203 are arranged on the PCB 601.

In this embodiment, a transparent silicon gel material layer 602 can be filled between the wavelength selector 203 and the PCB 601 to further secure the wavelength selector 203 and the PCB 601. A hydro and oxygen-isolation layer (not illustrated) can be further arranged above the quantum dot film 201 to form an integral closed structure. The structure and use of the hydro and oxygen-isolation layer are the same as the hydro and oxygen-isolation layer in the embodiment above, so a repeated description thereof will be omitted here Reference can be made to the quantum dot light emitting device illustrated in FIG. 2B for other structures and functions of the quantum dot light emitting device according to this embodiment, so a repeated description thereof will be omitted here.

Further to the embodiments above of the disclosure, an embodiment of the disclosure provides a backlight module including the quantum dot light emitting device according to any one of the embodiments of the disclosure.

Figure 8:
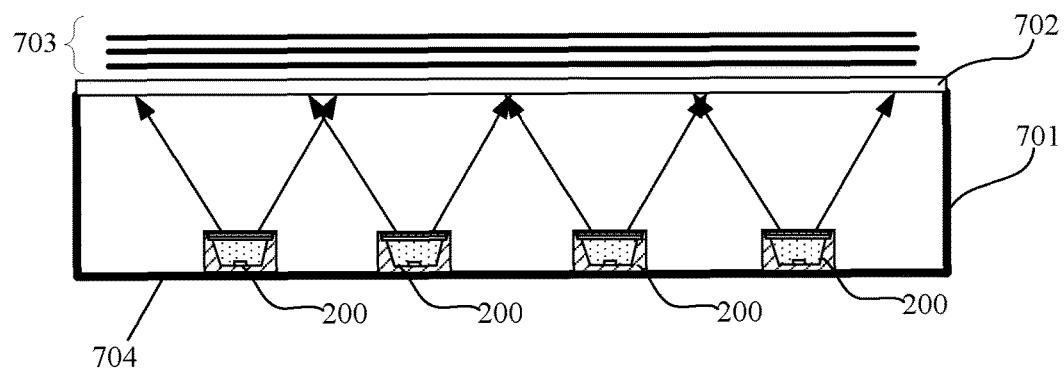
FIG. 8 is a schematic structural diagram of a backlight module according to a still further embodiment of the disclosure.

As illustrated in FIG. 8, taking as an example the quantum dot light emitting device illustrated in FIG. 3, the backlight module includes a groove-shaped backboard 701, a scattering plate 702, and a set of films 703 in addition to the quantum dot light emitting device 200, where the quantum dot light emitting device 200 is arranged on a bottom plate 704 of the groove-shaped backboard 701, the quantum dot film 201 is arranged parallel to the bottom plate 703 of the backboard 701, the scattering plate 702 is arranged above the quantum dot light emitting device 200, and the set of films 703 is arranged above the scattering plate 702. It shall be noted that a liquid crystal panel can be further arranged above the set of films 703.

In this embodiment, the number of quantum dot light emitting devices 200 may be plural, and the quantum dot light emitting devices 200 are typically soldered on the groove-shaped backboard 701, where the backlight is incident on the scattering plate 702. The scattering plate 702 has heat-resistance, a stable size, mechanical strength, incombustibility, and other good performances, and also has high light transmittivity, and excellent shielding and robustness so that there is an optimum effect of scattering the backlight, so the scattering plate has been widely applied at present. The set of films 703 functions to have the light rays transmitted uniformly to thereby eliminate the problem of non-uniform brightness and darkness as observed at a specific angle of view.

The straight-downward backlight module according to this embodiment has low weight, and the wavelength selector is arranged between the backlight source and the quantum dot film to transmit the light rays in the first band, and to reflect the light rays in the second band, so that the light rays in the first band emitted by the backlight source are incident on the quantum dot film and excite the quantum dot film to emit the light rays in the second band, and the light rays in the second band scattered backward are reflected by the wavelength selector to be emitted again to the quantum dot film, and to excite the quantum dots to emit the light rays in the second band, or to be transmitted through the quantum dot film to be mixed with the other light rays into the backlight, to thereby improve the utilization ratio of the light rays emitted by the quantum dots and generate more backlight for a better effect. Thus the desirable backlight can be generated while lowering the power of the backlight source to thereby both conserve energy to protect the environment, and avoid heat radiated by the backlight source 202 from affecting the other components of the product, for example, so that the other components can be avoided as much as possible from aging while being heated, to thereby prolong the lifetime of the product in service and improve the quality of the product.

Further to the embodiments above of the disclosure, an embodiment of the disclosure provides another backlight module including the quantum dot light emitting device according to any one of the embodiments above of the disclosure.

Figure 9:
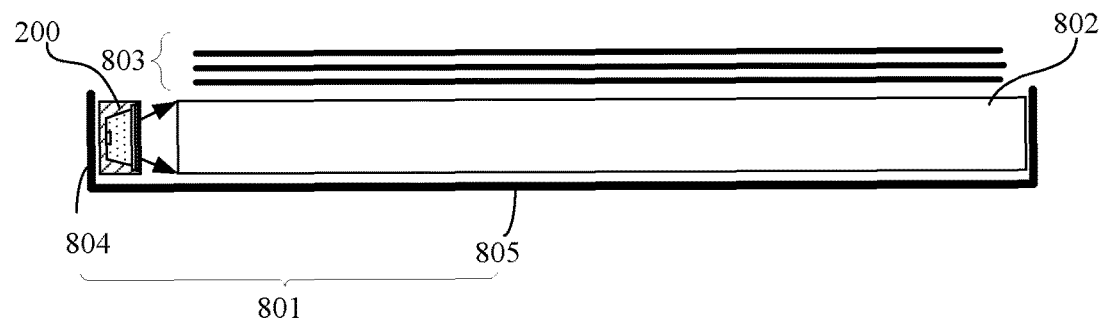
FIG. 9 is a schematic structural diagram of a backlight module according to a still further embodiment of the disclosure.

As illustrated in FIG. 9, taking as an example the quantum dot light emitting device illustrated in FIG. 3, the backlight module includes a groove-shaped backboard 801, a guiding plate 802, and a set of films 803 in addition to the quantum dot light emitting device 200, where the quantum dot light emitting device 200 is arranged on a side plate 804 of the groove-shaped backboard 801, the quantum dot film is arranged parallel to the side plate, the guiding plate 802 is arranged on a bottom plate 805 of the groove-shaped backboard 801, the quantum dot light emitting device 200 is located on a side of the guiding plate 802, and the set of films 803 is arranged above the guiding plate 802. It shall be noted that a liquid crystal panel can be further arranged above the set of films 803.

In this embodiment, the quantum dot light emitting devices 200 can be soldered on the bottom plate 805 of the groove-shaped backboard 801, and the guiding plate 802 functions to transform a linear light source into an area light source. The set of films 803 functions to have the light rays transmitted uniformly to thereby eliminate the problem of non-uniform brightness and darkness as observed at a specific angle of view.

The side-incident backlight module according to this embodiment makes the backlight more uniform and stable to thereby guarantee a display effect, and the wavelength selector is arranged between the backlight source and the quantum dot film to transmit the light rays in the first band, and to reflect the light rays in the second band, so that the light rays in the first band emitted by the backlight source are incident on the quantum dot film and excite the quantum dot film to emit the light rays in the second band, and the light rays in the second band scattered backward are reflected by the wavelength selector to be emitted again to the quantum dot film, and to excite the quantum dots to emit the light rays in the second band, or to be transmitted through the quantum dot film to be mixed with the other light rays into the backlight, to thereby improve the utilization ratio of the light rays emitted by the quantum dots and generate more backlight for a better effect. Thus the desirable backlight can be generated while lowering the power of the backlight source to thereby both conserve energy to protect the environment, and avoid heat radiated by the backlight source 202 from affecting the other components of the product, for example, so that the other components can be avoided as much as possible from aging while being heated, to thereby prolong the lifetime of the product in service and improve the quality of the product.

Figure 10:
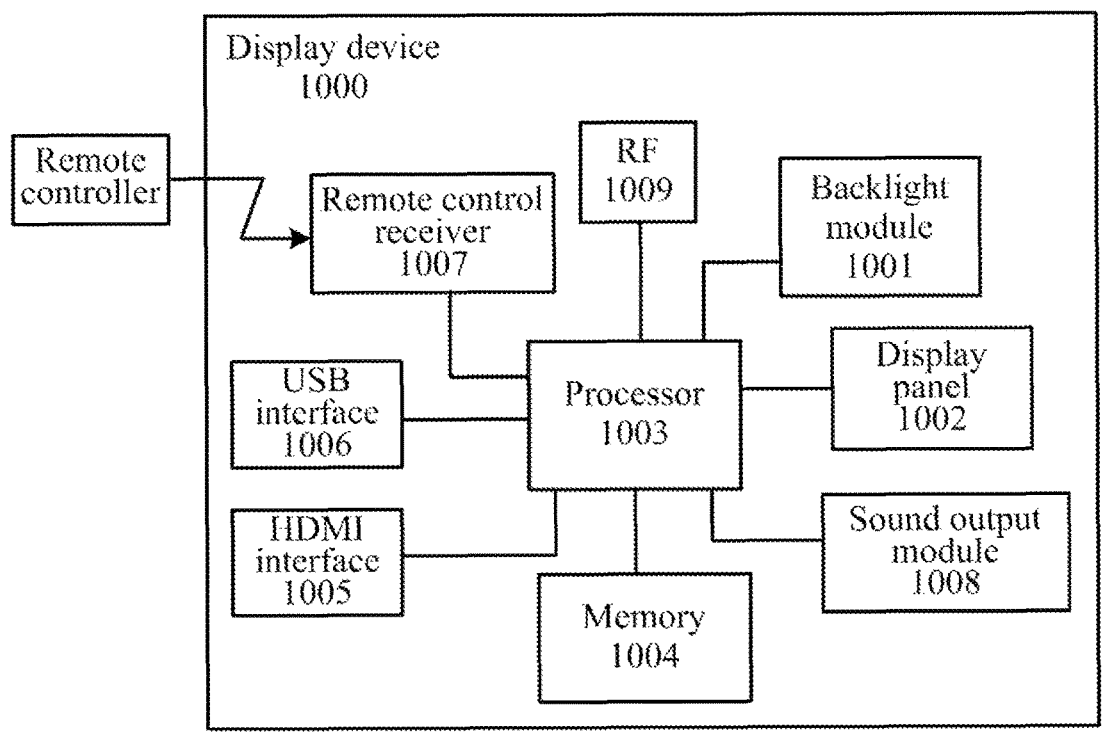
FIG. 10 is a schematic structural diagram of a display device to which a backlight module according to some embodiments of the disclosure is applied.

FIG. 10 illustrates a schematic structural diagram of a display device to which a backlight module according to some embodiments of the disclosure is applied. As illustrated in FIG. 10, in addition to the backlight module 1001 according to any one of the embodiments above of the disclosure, the display device 1000 can include at least one processor 1003, at least one memory 1004, at least one input unit, and at least one output unit. Those ordinarily skilled in the art shall appreciate that the display device 1000 according to some embodiments of the disclosure will not be limited to the structure as illustrated in FIG. 10, but can include more or less components than those as illustrated or some of the components can be combined or different components can be configured for different applications of the display device 1000.

The memory 1004 can be configured to store software programs and modules, and the processor 1003 is configured to run the software programs and modules stored in the memory 1004 to thereby perform various function applications and data processes. The memory 1004 can include a high-speed random access memory and can further include a nonvolatile memory, e.g., at least one magnetic-disk memory device, a flash memory device or another volatile solid memory device. Furthermore the memory 1004 can further include a memory controller configured to provide an access of the processor and the input unit to the memory 1004.

The processor 1003 is a control center of the display device 1000 and has the respective components of the entire display device 1000 connected by various interfaces and lines. The processor 1003 can run or execute the software programs and/or modules stored in the memory 1004, and invoke the data stored in the memory 1004 to perform the various functions of the display device 1000 and process the data to thereby manage and control the display device 1000 as a whole. The processor 1003 can include one or more processing cores. The processor 103 can be integrated with an application processor and a modem processor, where the application processor generally handles an operating system, user interfaces, applications, etc., and the modem processor generally handles wireless communication. As can be appreciated, the modem processor may not be integrated into the processor 1003.

The input unit can further include a TV and radio receiver, a High-Definition Multimedia (HDMI) interface 1005, a USB interface 1006, an audio and video input interface, and a remote control receiver 1007. Moreover the input unit can further include a touch sensitive surface and other input devices, where the touch sensitive surface can be embodied in various types of resistive, capacitive, infrared, surface sound wave and other types, and the other input device can include but will not be limited to one or more of a physical keyboard, functional keys (e.g., volume control press keys, a power-on or-off press key, etc.), a track ball, a mouse, a joystick, etc.

The output unit is configured to output an audio signal, a video signal, an alert signal, a vibration signal, etc. The output unit can include a display panel 1002, a sound output module 1008, etc. The display panel 1002 can be configured to display information input by a user or information provided to the user and various graphic user interfaces of the display device 1000, where these graphic user interfaces can be composed of graphics, texts, icons, videos and any combination thereof. For example, the display panel can be embodied as a Liquid Crystal Display (LCD), an Organic Light-Emitting Diode (OLED), a flexible display, a 3D display, a CRT, a plasmas display panel, etc.

The display device 1000 can further include at least one sensor (not illustrated), e.g., an optical sensor, a motion sensor and other sensors. Particularly the optical sensor can include an ambient optical sensor and a proximity sensor, where the ambient optical sensor can adjust the brightness of the display panel 1002 according to the luminosity of ambient light rays, and the proximity sensor can power off the display panel and/or a backlight when the display device 1000 moves to some position. The display device 1000 can be further configured with a gyroscope, a barometer, a hygrometer, a thermometer, an infrared sensor and other sensors.

The display device 1000 can further include an audio circuit (not illustrated), and a speaker and a transducer can provide an audio interface between the user and the display device 1000. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor 1003 for processing and then transmitted to another terminal, for example, or the audio data is output to the memory 1004 for further processing. The audio circuit may further include an earphone jack for communication between a peripheral earphone and the display device 1000.

Moreover the display device 1000 can further include a Radio Frequency (RF) circuit 1009. The RF circuit 1009 can be configured to receive and transmit a signal. Typically the RF circuit 1009 includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the display device 1000 can further include a web cam, a Bluetooth module, etc.

Moreover the display device 1000 can further include a Wireless Fidelity (WiFi) module (not illustrated). The WiFi falls into the category of short-range wireless transmission technologies, and the display device 1000 can assist the user in receiving and transmitting an e-mail, browsing a webpage, accessing streaming media, etc., through the WiFi module by which the user is provided with a wireless access to the broadband Internet. Although the WiFi module is illustrated in FIG. 10, it can be appreciated that it may not be necessarily required for the display device 1000 but can be omitted as desired without departing from the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A quantum dot light emitting device comprising:
   a quantum dot film comprising a plurality of quantum dots;
   a backlight source configured to emit light rays in a first band to the quantum dot film to excite the plurality of quantum dots to emit light rays in a second band;
   a wavelength selector arranged between the quantum dot film and the backlight source, the wavelength selector configured to transmit the light rays in the first band and reflect the light rays in the second band emitted by the quantum dot film to the wavelength selector; and
   a groove-shaped bracket comprising two side brackets arranged opposite to each other and a bottom plate connected between the two side brackets, the backlight source fixed to the bottom plate of the groove-shaped bracket, ends of the quantum dot film and the wavelength selector arranged on the two side brackets of the groove-shaped bracket, and wherein an angle between each of the two side brackets and the bottom plate is an obtuse angle.

2. The quantum dot light emitting device according to claim 1, wherein:
   the backlight source is a blue light source, wherein wavelengths in the first band range from 446 nm to 464 nm, and wherein wavelengths in the second band range from 500 nm to 578 nm and from 620 nm to 760 nm; or
   wherein the backlight source is a purple light source, wherein wavelengths in the first band range from 400 nm to 446 nm, and wherein wavelengths in the second band range from 500 nm to 578 nm, from 620 nm to 760 nm, and from 446 nm to 464 nm.

3. The quantum dot light emitting device according to claim 1, wherein the quantum dot film and the wavelength selector are fitted to each other.

4. The quantum dot light emitting device according to claim 3, wherein both the quantum dot film and the wavelength selector are flat plate-shaped.

5. The quantum dot light emitting device according to claim 3, wherein both the quantum dot film and the wavelength selector are arc-shaped protruding away from the backlight source.

6. The quantum dot light emitting device according to claim 1, wherein the quantum dot film is arc-shaped protruding away from the backlight source, and wherein the wavelength selector is flat plate-shaped.

7. The quantum dot light emitting device according to claim 1, wherein a reflection film is arranged on inner walls of the side brackets.

8. The quantum dot light emitting device according to claim 1, wherein silicon gel is filled between the wavelength selector and the bottom plate.

9. The quantum dot light emitting device according to claim 1, wherein a hydro and oxygen-isolation layer is arranged on the quantum dot film.

10. The quantum dot light emitting device according to claim 1, further comprising:
    a printed circuit board on which the backlight source is fixed, wherein both the quantum dot film and the wavelength selector are arc-shaped protruding away from the backlight source, and wherein both ends of the quantum dot film and the wavelength selector are arranged on the printed circuit board.

11. The quantum dot light emitting device according to claim 10, wherein silicon gel is filled between the wavelength selector and the bottom plate.

12. The quantum dot light emitting device according to claim 10, wherein a hydro and oxygen-isolation layer is arranged on the quantum dot film.

13. A backlight module comprising:
    a quantum dot light emitting device including a quantum dot film comprising a plurality of quantum dots, a backlight source configured to emit light rays in a first band to the quantum dot film to excite the plurality of quantum dots to emit light rays in a second band, a wavelength selector arranged between the quantum dot film and the backlight source, and a groove-shaped bracket comprising two side brackets arranged opposite to each other and a bottom plate connected between the two side brackets, the wavelength selector configured to transmit the light rays in the first band and reflect the light rays in the second band emitted by the quantum dot film to the wavelength selector; the backlight source fixed to the bottom plate of the groove-shaped bracket, ends of the quantum dot film and the wavelength selector arranged on the two side brackets of the groove-shaped bracket, and wherein an angle between each of the two side brackets and the bottom plate is an obtuse angle.

14. The backlight module according to claim 13, further comprising:
    a groove-shape backboard, wherein the quantum dot light emitting device is arranged on a bottom plate of the groove-shape backboard and facing away from the bottom plate of the groove-shape backboard;
    a scattering plate arranged above the quantum dot light emitting device; and
    a set of films arranged above the scattering plate.

15. The backlight module according to claim 13, further comprising:
    a groove-shape backboard, wherein the quantum dot light emitting device is arranged on a side plate of the groove-shape backboard and facing away from the side plate of the groove-shape backboard;
    a guiding plate arranged on a bottom plate of the groove-shape backboard, wherein the quantum dot light emitting device is located on a side of the guiding plate; and
    a set of films arranged above the guiding plate.

16. The backlight module according to claim 13, wherein the quantum dot light emitting device further comprises:
    a printed circuit board on which the backlight source is fixed, wherein both the quantum dot film and the wavelength selector are arc-shaped protruding away from the backlight source, and wherein both ends of the quantum dot film and the wavelength selector are arranged on the printed circuit board.

17. A display device comprising:
    a backlight module including a quantum dot light emitting device, the quantum dot light emitting device including a quantum dot film comprising a plurality of quantum dots, a backlight source configured to emit light rays in a first band to the quantum dot film to excite the plurality of quantum dots to emit light rays in a second band, a wavelength selector arranged between the quantum dot film and the backlight source, and a groove-shaped bracket comprising two side brackets arranged opposite to each other and a bottom plate connected between the two side brackets, the wavelength selector configured to transmit the light rays in the first band and reflect the light rays in the second band emitted by the quantum dot film to the wavelength selector; the backlight source fixed to the bottom plate of the groove-shaped bracket, ends of the quantum dot film and the wavelength selector arranged on the two side brackets of the groove-shaped bracket, and wherein an angle between each of the two side brackets and the bottom plate is an obtuse angle.

* * * * *